United States Patent
Kumar et al.

(10) Patent No.: US 10,853,524 B2
(45) Date of Patent: Dec. 1, 2020

(54) SYSTEM AND METHOD FOR PROVIDING SECURITY FOR ROBOTS

(71) Applicant: WIPRO LIMITED, Bangalore (IN)

(72) Inventors: Vijay Kumar, Bangalore (IN); Thomas Chittakattu Ninan, Angadikadavu (IN); Yateesh Kumar Shivarudraiah, Bangalore (IN); Ramkumar Gandhinathan, Chennai (IN)

(73) Assignee: Wipro Limited, Bangalore (IN)

( * ) Notice: Subject to any disclaimer, the term of this patent is extended or adjusted under 35 U.S.C. 154(b) by 307 days.

(21) Appl. No.: 15/916,602

(22) Filed: Mar. 9, 2018

(65) Prior Publication Data
US 2019/0228188 A1    Jul. 25, 2019

(30) Foreign Application Priority Data
Jan. 23, 2018    (IN) .............................. 201841002639

(51) Int. Cl.
| | |
|---|---|
| *G06F 21/81* | (2013.01) |
| *H04L 9/10* | (2006.01) |
| *H04L 9/32* | (2006.01) |
| *G06F 21/34* | (2013.01) |

(52) U.S. Cl.
CPC ................ *G06F 21/81* (2013.01); *H04L 9/10* (2013.01); *H04L 9/3297* (2013.01); *G06F 21/34* (2013.01)

(58) Field of Classification Search
CPC . G06F 21/81; G06F 21/34; H04L 9/10; H04L 9/3297; B25J 18/04; B25J 9/10
See application file for complete search history.

(56) References Cited

U.S. PATENT DOCUMENTS

| | | | |
|---|---|---|---|
| 7,393,172 B1 * | 7/2008 | Saeki ................ | H01L 21/67766 414/217.1 |
| 7,720,572 B2 | 5/2010 | Ziegler et al. | |
| 9,121,361 B2 * | 9/2015 | Shimizu ................ | F02D 41/221 |

(Continued)

OTHER PUBLICATIONS

Ren C. Lu, et al., A Practical Wireless Attack on the Connected Car and Security Protocol for In-Vehicle CAN, Oct. 2006, 2006 IEEE International Conference on Systems, Man and Cybernetics), pp. 1-6.*

(Continued)

*Primary Examiner* — Farid Homayounmehr
*Assistant Examiner* — Raied A Salman
(74) *Attorney, Agent, or Firm* — Finnegan, Henderson, Farabow, Garrett & Dunner, LLP

(57) ABSTRACT

The present disclosure discloses a security system for robots. The security system comprises a lock located on a platform, configured to restrict power supply to a plurality of actuators of a robotic arm, a key configured to release the lock for providing power supply to the plurality of actuators and a processing unit. The processing unit is configured to restrict power supply to the robotic arm by initiating the lock, relocate the lock to a random location on the platform, generate an encrypted code based on the random location of the lock and a time-stamp and provide the encrypted code to the control unit for decryption. Upon decryption, the control unit configures the lock to supply power to the plurality of actuators. The plurality of actuators operates the robotic arm to pick the key and release the lock for supplying power to the plurality of actuators.

7 Claims, 9 Drawing Sheets

(56) References Cited

U.S. PATENT DOCUMENTS

| | | | |
|---|---|---|---|
| 10,294,697 B2* | 5/2019 | Sundberg | E05C 7/00 |
| 10,403,070 B2* | 9/2019 | Klink | H04L 63/108 |
| 2004/0049324 A1 | 3/2004 | Walker | |
| 2005/0285716 A1* | 12/2005 | Denison | G07C 9/00571 |
| | | | 340/5.2 |
| 2009/0308116 A1* | 12/2009 | Lambrou | E05B 47/02 |
| | | | 70/277 |
| 2012/0054998 A1* | 3/2012 | Tschida | F16B 19/109 |
| | | | 29/426.1 |
| 2012/0162887 A1* | 6/2012 | Purser | G06F 1/182 |
| | | | 361/679.08 |
| 2013/0041555 A1* | 2/2013 | Kouzuma | E05B 77/12 |
| | | | 701/36 |
| 2013/0091589 A1* | 4/2013 | Shiakallis | G06F 21/81 |
| | | | 726/34 |
| 2014/0047527 A1* | 2/2014 | Ngo | H04L 63/08 |
| | | | 726/7 |
| 2014/0286565 A1* | 9/2014 | Ikenaga | G06K 9/6254 |
| | | | 382/152 |
| 2018/0079090 A1* | 3/2018 | Koenig | B25J 18/04 |
| 2018/0149268 A1* | 5/2018 | Nakade | F16H 63/483 |
| 2020/0092676 A1* | 3/2020 | Kuenzi | G07C 9/00904 |

OTHER PUBLICATIONS

Alexander Basan, et al., Analysis of ways to secure group control for autonomous mobile robots, Proceedings of the 10th International Conference on Security of Information and NetworksOct. 2017 pp. 134-139.*

Plooij, M., et al., "Review of locking devices used in robotics", *IEEE*, 2015, pp. 1-13.

* cited by examiner

SYSTEM AND METHOD FOR PROVIDING SECURITY FOR ROBOTS

TECHNICAL FIELD

The present disclosure relates to industrial automation tools. Specifically, but not exclusively, the present disclosure relates to a system and a method for providing security to robots.

BACKGROUND

Robots are used in many applications. Robots are used as high speed and precision are achieved. Autonomous robots are used in isolated environments where human interference is minimal. Robots which operate with human collaboration are known as co-bots (collaborative robots). There are various types of co-bots and few co-bots can be used with or without any additional safety features. Co-bots can perform a variety of tasks. The co-bots require a substantial engineering effort with a carefully planned interaction methodology, so that human operators can effectively utilize robotic resources.

Cobots are controlled either manually or using a computer. Prior to controlling the co-bots manually or using computers, the co-bots must be provided with power. Once the power is provided, the co-bots can be instructed to perform specific tasks. In the conventional systems, often the co-bots are not secured and are mishandled. Mishandling the co-bots may lead to many undesired effects. In a scenario, an unauthorized user may switch on power and may misuse the co-bots manually. In another scenario, where the co-bots are controlled by computers, the unauthorized user may access the computer to misuse the co-bots. Thus, the conventional systems do not provide security to the co-bots. The misuse of co-bots may also cause harm to users working alongside the co-bots.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure discloses a security system for robots. The security system comprises, a lock located on a platform, configured to restrict power supply to a plurality of actuators of a robotic arm, a key placed at, a predefined location, at a predefined distance from the robotic arm configured to release the lock for providing power supply to the plurality of actuators, and a processing unit. The processing unit is configured to restrict power supply to the robotic arm by initiating the lock, when the robotic arm is initiated by a control unit configured to control the plurality of actuators. Further, the processing unit relocates the lock to a random location on the platform and generate an encrypted code based on the random location of the lock and a time-stamp. Then, the processing unit provides the encrypted code to the control unit for decryption, where upon decryption, the control unit configures the lock to supply power to the plurality of actuators, where the plurality of actuators operates the robotic arm to pick the key and release the lock for supplying power to the plurality of actuators.

In an embodiment, the present disclosure discloses a control unit for providing security for robots. The control unit is configured to initiate a plurality of actuators of a robotic arm providing limited freedom for the movement of the robotic arm. Upon initiation, a processing unit associated with the control unit initiates a lock located on a platform to restrict power to the robotic arm. Further, the processing unit relocates the lock to a random location on the platform and generate an encrypted code based on the random location of the lock and a time-stamp. Thereafter, the processing unit decrypts the encrypted code for determining the random location of the lock, configures the lock to supply power to at least one actuator among the plurality of actuators of the robotic arm and instruct the at least one actuator to operate the robotic arm to pick a key placed at a predefined located, at a predefined distance from the robotic arm, to release the lock for providing power supply to the plurality of actuators.

In an embodiment the present disclosure discloses a method for providing security for robots. The method comprises initiating a plurality of actuators of a robotic arm. Upon initiation, a processing unit associated with the control unit initiates a lock located on a platform to restrict power to the robotic arm. Further, the processing unit relocates the lock to a random location on the platform and generate an encrypted code based on the random location of the lock and a time-stamp. Thereafter, the processing unit decrypts the encrypted code for determining the random location of the lock, configures the lock to supply power to at least one actuator among the plurality of actuators of the robotic arm and instruct the at least one actuator to operate the robotic arm to pick a key placed at a predefined located, at a predefined distance from the robotic arm, to release the lock for providing power supply to the plurality of actuators.

In an embodiment the present disclosure discloses A non-transitory computer readable medium including instructions stored thereon that when processed by at least one processor cause a device to perform operations comprising: initiating a plurality of actuators of a robotic arm. Upon initiation, a processing unit associated with the control unit initiates a lock located on a platform to restrict power to the robotic arm. Further, the processing unit relocates the lock to a random location on the platform and generate an encrypted code based on the random location of the lock and a time-stamp. Thereafter, the processing unit decrypts the encrypted code for determining the random location of the lock, configures the lock to supply power to at least one actuator among the plurality of actuators of the robotic arm and instruct the at least one actuator to operate the robotic arm to pick a key placed at a predefined located, at a predefined distance from the robotic arm, to release the lock for providing power supply to the plurality of actuators.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The novel features and characteristic of the disclosure are set forth in the appended claims. The disclosure itself, however, as well as a preferred mode of use, further objectives and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which:

Figure 1:
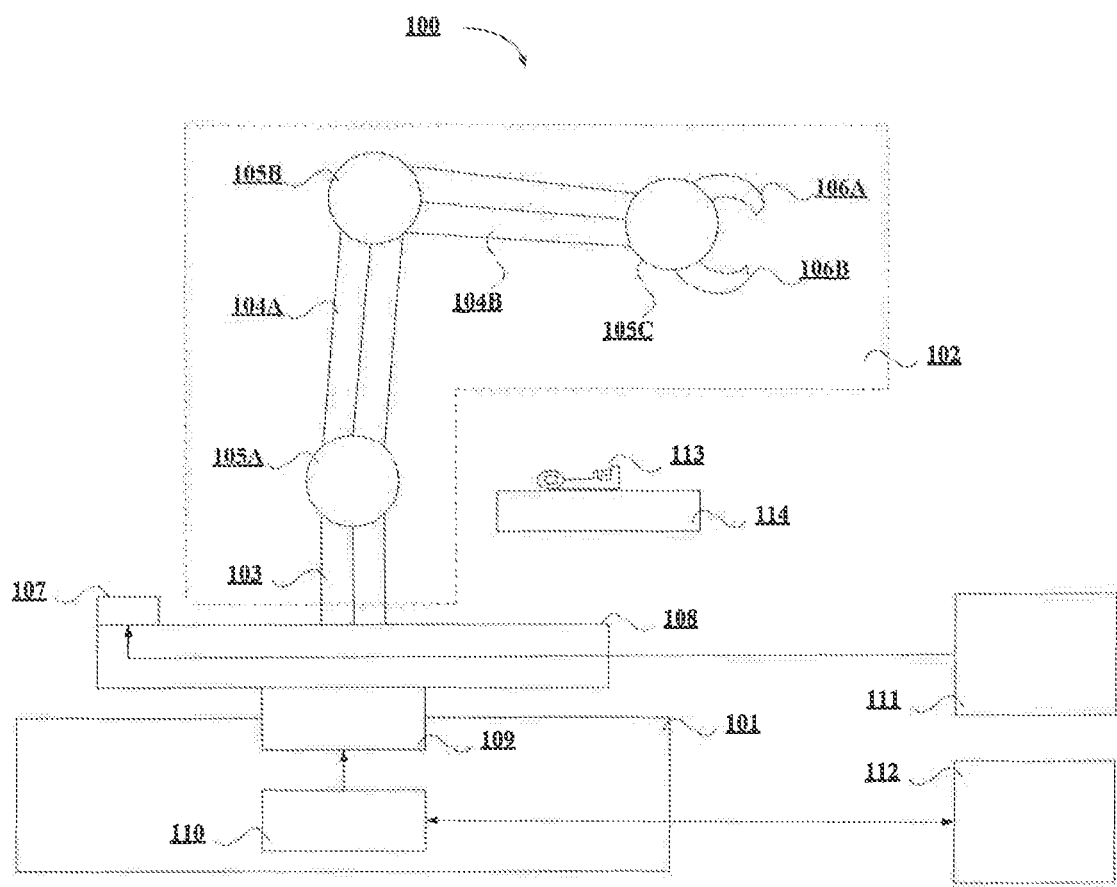
FIG. 1 illustrates an exemplary structure of security system for a robot, in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

Embodiments of the present disclosure relate to a system for providing security to robots. The system comprises a lock located on a platform associated with robot, a key configured to release the lock, a processing unit and a control unit and a power source. When the robotic arm is initiated by the control unit, the processing unit restricts power to the robotic arm comprising plurality of actuators, by initiating the lock. Further, the processing unit relocates the lock to a random location on the platform and generates a code based on the random location. The code is provided to the control unit for decryption. The control unit decrypts the code to determine the random location of the lock. Further, the control unit configures the lock to supply power to at least one actuator and controls the at least one actuator and one or more end effectors to pick the key. Then, the key is used to release the lock for supplying power to the plurality of actuators of the robotic arm.

In an embodiment, FIG. 1 illustrates an exemplary structure of a security system 100 for a robot, in accordance with some embodiments of the present disclosure. The security system 100 comprises a base 101, a robotic arm 102, a robotic arm column 103, a first arm joint 104A, a second arm joint 104B, a first actuator 105A, a second actuator 105B, a third actuator 105C, a first end effector 106A, a second end effector 106B, a lock 107, a lock platform 108, a lock actuator 109, a processing unit 110, a power source 111, a control unit 112, a key 113 and a key platform 114.

In an embodiment, the base 101 may be a support for the robotic arm 102, and the platform 108. Also, the base 101 may house the lock actuator 109 and the processing unit 110.

In an embodiment, the robotic arm 102 may be an electro-mechanical arm. The robotic arm 102 may be used to perform various functions. In an embodiment, the security system 100 may comprise a plurality of robotic arms. The robotic arm 102 may be one of, but is not limited to, a cartesian robot type, a cylindrical robot type, a spherical robot type, an articulated robot type, a parallel robot type, a Selective Compliance Assembly Robot Arm (SCARA) and anthropomorphic robot type.

The robotic arm column 103 may act as a support to the robotic arm 102 or can be one of the movable joints of the robotic arm 102. The robotic arm column 103 may be configured at the bottom of the robotic arm 102 where the weight of the robotic arm 102 is centred. In an embodiment, the robotic arm 102 may comprise a plurality of robotic arm columns 103. Also, the robotic arm column 103 may be configured in any location of the robotic arm 102.

In an embodiment, the robotic arm 102 may comprise one or more arm joints. The first arm joint 104A, and the second arm joint 104B may be collectively represented as one or more arm joints 104. The one or more arm joints 104 may be configured to move in a predefined axis or predefined axes. The one or more arm joints 104 may be configured to provide a three-axis movement for the robotic arm 102.

In an embodiment, the first end effector 106A and the second end effector 106B may be collectively represented as one or more end effectors 106 in the present disclosure. The one or more end effectors 106 are connected to end of the robotic arm 102. In an embodiment, the one or more end effectors 106 may interact with the environment for providing functionality of the robotic arm 102. For example, in a robotic arm 102 used to tighten a screw, a screw driver may be the end effector. The screw is the environment and the screw driver of the robotic arm 102 is in contact with the screw. The one or more end effectors 106 may be, but is not limited to a gripper, a force-torque sensor, a material removal tool, a welding torch, a collision sensor, and a tool changer.

In an embodiment, the first actuator 105A, the second actuator 105B and the third actuator 105C may be collectively represented as plurality of actuators 105 in the present disclosure. The plurality of actuators 105 may be configured to operate corresponding one or more arm joints 104 in a predefined axis or predefined axes. For example, from FIG. 1, the actuator 105A is configured to operate the arm joint 104A in a predefined axis or predefined axes. In an embodiment, the plurality of actuators 105 may be configured to operate the one or more end effectors 106 in a predefined axis or predefined axes.

In an embodiment, the lock 107 may be connected to the power source 111. The lock 107 may be configured to restrict power from the power source 111 to the plurality of actuators 105. The lock may be connected to each of the plurality of actuators 105 (not shown in figure). The lock may be a conventional lock or any suitable lock that may restrict supply of power from the power source 111 to the plurality of actuators 105.

In an embodiment, the processing unit 110 may be configured to initiate the lock 107 and restrict power supply to the plurality of actuators 105. The processing unit 110 may initiate the lock 107 when the control unit 112 initiates the robotic arm 102. Further, the processing unit 110 may provide instructions to the lock actuator 109 to relocate the lock 107 to a random location on the platform 108. The lock actuator 109 may relocate the lock to a random location on the platform 108. Thereafter, the processing unit 110 generates an encrypted code based on the random location of the lock 107 and provides the encrypted code to the control unit 112 for decrypting. The control unit 112 decrypts the encrypted code to determine the random location of the lock 107. Further, the control unit 112 configures the lock 107 to supply power to at least one actuator among the plurality of actuators 105. Furthermore, the control unit 112 instructs the at least one actuator to pick the key 113 and release the lock 107 for supplying power to the plurality of actuators 105.

In an embodiment, the key 113 may be placed at a predefined location and at a predefined distance from the at least one actuator. Thus, control unit 112 may instruct the at least one actuator to pick the key for releasing the lock 107. In an embodiment, the key 113 may be placed on a key platform 114.

In an embodiment, the power source 111 may be, but is not limited to a battery, a cell, grid and the like.

Figure 2:
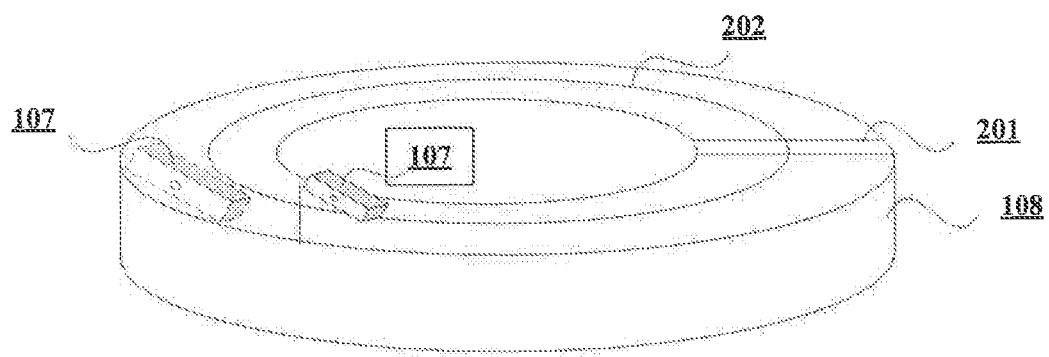
FIG. 2 illustrates a platform of a lock, for providing security to robots, in accordance with some embodiments of the present disclosure.

FIG. 2 illustrates the platform 108 of the lock 107, for providing security to robots, in accordance with some embodiments of the present disclosure. The lock 107 may be placed on the platform 108. The lock is relocated to a random location on the platform 108 by the lock actuator 109. FIG. 2 shows an exemplary embodiment, where the lock 107 is moved from an initial location to a random location. The lock 107 (dotted line) indicates an initial location. The lock 107 (continuous line) may indicate a relocated location. FIG. 2 shows the platform 108 comprising a circular track 202 and a connecting track 201. In an embodiment, the platform 108 may comprise a plurality of circular tracks 202 and a plurality of connecting tracks 201. At the initial location, the lock 107 may be located on a predefined circular track 202, for example a first circular track. In one embodiment, the lock 107 may be moved from the initial location to a random location on the first circular track. In an embodiment, the lock 107 may be moved from the first circular track to a second circular track. Further, the lock 107 may be moved to a random location in the second circular track. The movement from the first circular track to the second circular track may be enabled by the connecting track 201. The connecting track 201 connects one circular track to another circular track. In an embodiment, the connecting track 201 may connect a plurality of circular tracks. As shown in FIG. 2, the lock 107 has been moved from the initial location from one circular track to another location on another circular track. The lock actuator 109 may comprise a mechanism to move the lock 107 to a random location on the platform 108. The actuator 109 may use the circular track 202 and the connecting track 201 to relocate the lock 107 to a random location.

In an embodiment, the platform 108 may comprise any technology that enables movement of the lock 107 on the platform 108. Also, the platform 108 may comprise tracks of any shape that enables the movement of the lock 107 to a random location on the platform 108.

Figure 3:
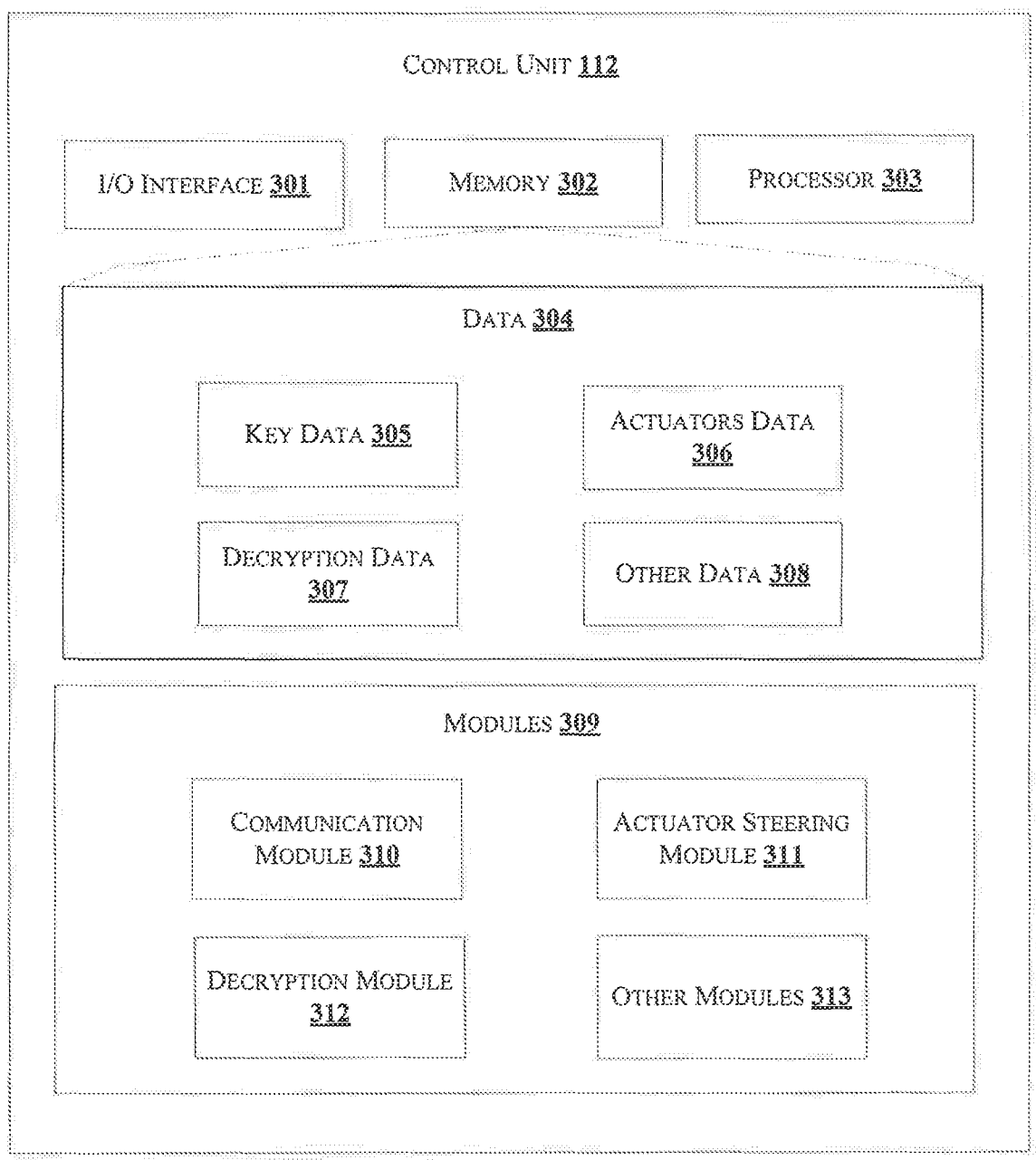
FIG. 3 is illustrative of internal architecture of a control unit for providing security to robots, in accordance with some embodiments of the present disclosure.

FIG. 3 illustrates internal architecture of the control unit 112 in accordance with some embodiments of the present disclosure. The control unit 112 may include at least one Central Processing Unit (CPU) or processor 303 and a memory 302 storing instructions executable by the at least one processor 303. The processor 303 may comprise at least one data processor for executing program components for executing user or system-generated requests. The memory 302 is communicatively coupled to the processor 303. The control unit 112 further comprises an Input/Output (I/O) interface 301. The I/O interface 301 is coupled with the processor 303 through which an input signal or/and an output signal is communicated.

In an embodiment, data 304 may be stored within the memory 302. The data 304 may include, for example, key data 305, actuators data 306, decryption data 307 and other data 308.

In an embodiment, the key data 305 may comprise, but is not limited to location of the key 113 on the key platform 114, distance of the key 113 from the at least one actuator, location of the key platform 114, and distance of the key platform 114 from the at least one actuator. The location of the key 113 is used to pick up the key 113 by the at least one actuator for releasing the lock 107.

In an embodiment, the actuators data 306 may include, but is not limited to, number of actuators 105 present in the robotic arm 102, number of actuators 105 required to be operated by the control unit 112 for picking the key 113, number of arm joints connected to each actuator 105, and the like.

In an embodiment, the decryption data 307 may include, but is not limited to a decryption key, encryption standard, etc.

In an embodiment, the other data 308 may include, but is not limited to, initial location of the lock 107, relocated location of the lock 107, etc.

In an embodiment, the data 304 in the memory 302 is processed by modules 309 of the control unit 112. As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality. The modules 309 when configured with the functionality defined in the present disclosure will result in a novel hardware.

In one implementation, the modules 309 may include, for example, a communication module 310, an actuator steering module 311, a decryption module 312 and other modules 313. It will be appreciated that such aforementioned modules 309 may be represented as a single module or a combination of different modules.

In an embodiment, the communication module 310 communicates with the plurality of actuators 105, the lock 107 and the processing unit 110. The communication module 310 may provide instructions to the plurality of actuators 105 to steer in a particular direction and distance. Also, the communication module 310 may instruct the plurality of actuators to perform specific tasks corresponding to actuator and a function associated with the actuator. For example, let us consider two actuators, a first actuator configured to rotate about an axis and a second actuator configured to provide a thrust. The communication module may instruct the first actuator to rotate in a predefined angle for a predefined time. Further, the communication module may instruct the second actuator to provide a predefined thrust for a predefined time.

In an embodiment, the communication module 310 receives the encrypted code from the processing unit 110. The processing unit 110 configures the lock 107 to be moved to a random location on the platform 108, when the plurality of actuators is initiated. Further, the processing unit 110 generates the encrypted code based on the random location of the lock 107. The communication module 310 receives the encrypted code from the processing unit 110 for decrypting.

In an embodiment, the communication module 310 instructs the lock 107 to release power to the at least one actuator among the plurality of actuators 105 when the encrypted code is decrypted.

In an embodiment, the actuator steering module 311 may steer the plurality of actuators in a predefined axis. The actuator steering module 311 may use the actuators data 306 to determine the type of actuators used in the robotic arm 102 and one or more parameters associated with each actuator 105. Further, based on the type of actuator and the one or more parameters, the actuator steering module 311 may steer the actuator 105 in a predefined axis. For example, consider a rotating mount as an actuator 105. The one or more parameters of the rotating mount may be direction of rotation, rotating per minute (rpm), power requirements, and the like. The actuator steering module 311 may rotate the rotating mount in a clockwise direction at a predefined rpm. Likewise, the actuator steering module 311 may steer any type of actuator 105.

In an embodiment, the decryption module 312 receives the encrypted code from the communication module 310. The decryption module 312 decrypts the encrypted code to determine the random location of the lock 107. The decryption module 312 may use any decryption methods to decrypt the encrypted code. For example, encryption methods to generate the encrypted code may include, but are not limited to, triple Data Encryption Standard (DES), Rivest-Shamir-Adleman (RSA), Blowfish, and Advanced Encryption Standard (AES). In an embodiment, each robotic arm 102 may have a corresponding decryption module 312. For example, a first robotic arm 102 may have a first decryption module 312 and a second robotic arm 102 may have a second decryption module 312. The decryption module 312 may be a proprietary module and may be accessed using credentials.

In an embodiment, the other modules 313 may include, but are not limited to, a user notification module.

In an embodiment, the user notification module may notify a user when the plurality of actuators is initiated, when the encrypted code is decrypted and in similar instances.

Figure 4:
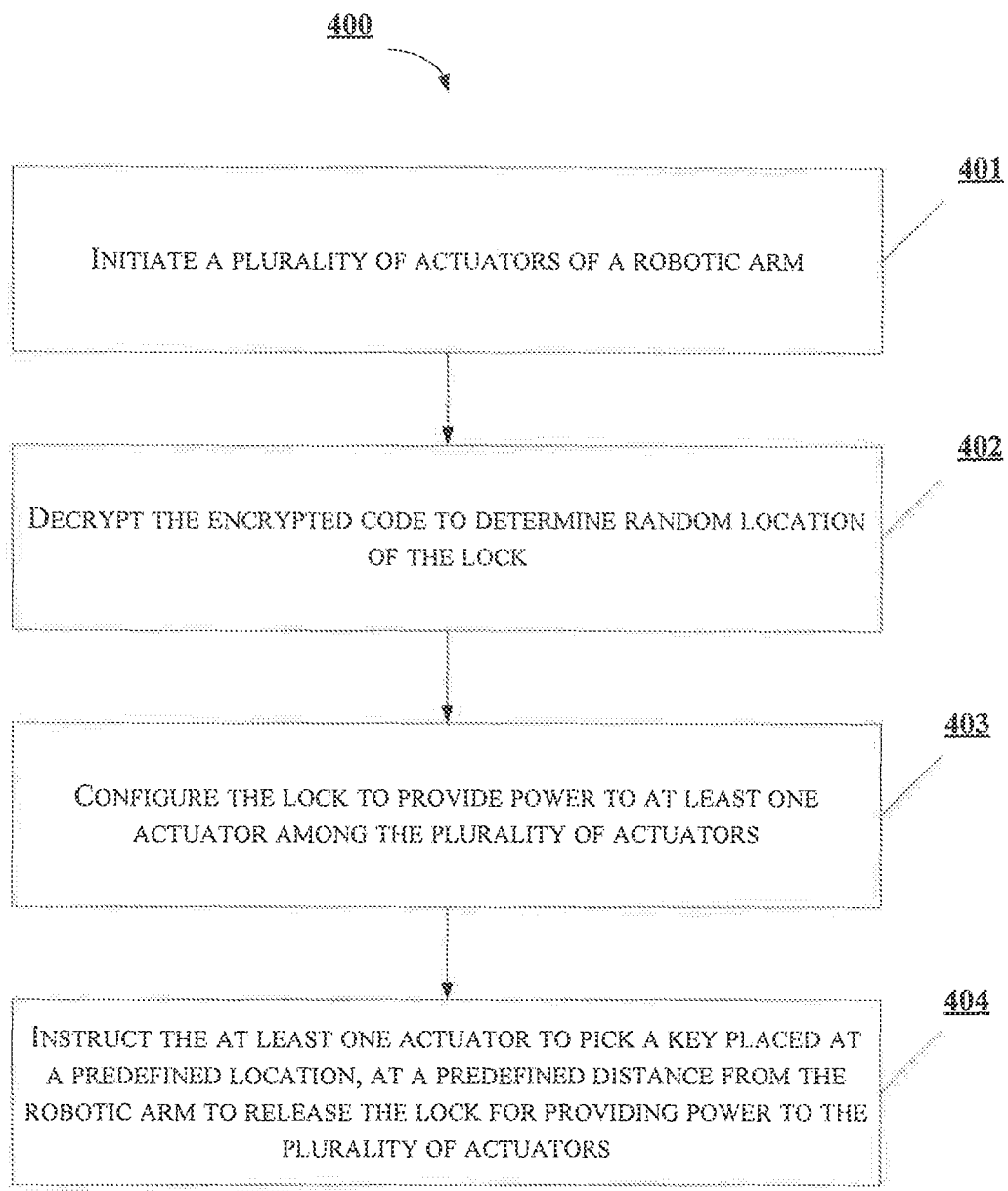
FIG. 4 and FIG. 5 show a flow chart illustrating method steps for providing security to robots, in accordance with some embodiments of the present disclosure.

FIG. 4 shows a flow chart illustrating a method for providing security to robots, in accordance with some embodiments of the present disclosure.

As illustrated in FIG. 4, the method 400 may comprise one or more steps for providing security to robots, in accordance with some embodiments of the present disclosure. The method 400 may be described in the general context of computer executable instructions. Generally, computer executable instructions can include routines, programs, objects, components, data structures, procedures, modules, and functions, which perform particular functions or implement particular abstract data types.

The order in which the method 400 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At step 401, the processor 303 of the control unit 112 may initiate the plurality of actuators 105. The processor 303 may be instructed by a user or may be configured to initiate the plurality of actuators 105 at a predefined time or upon a predefined event.

Figure 5:
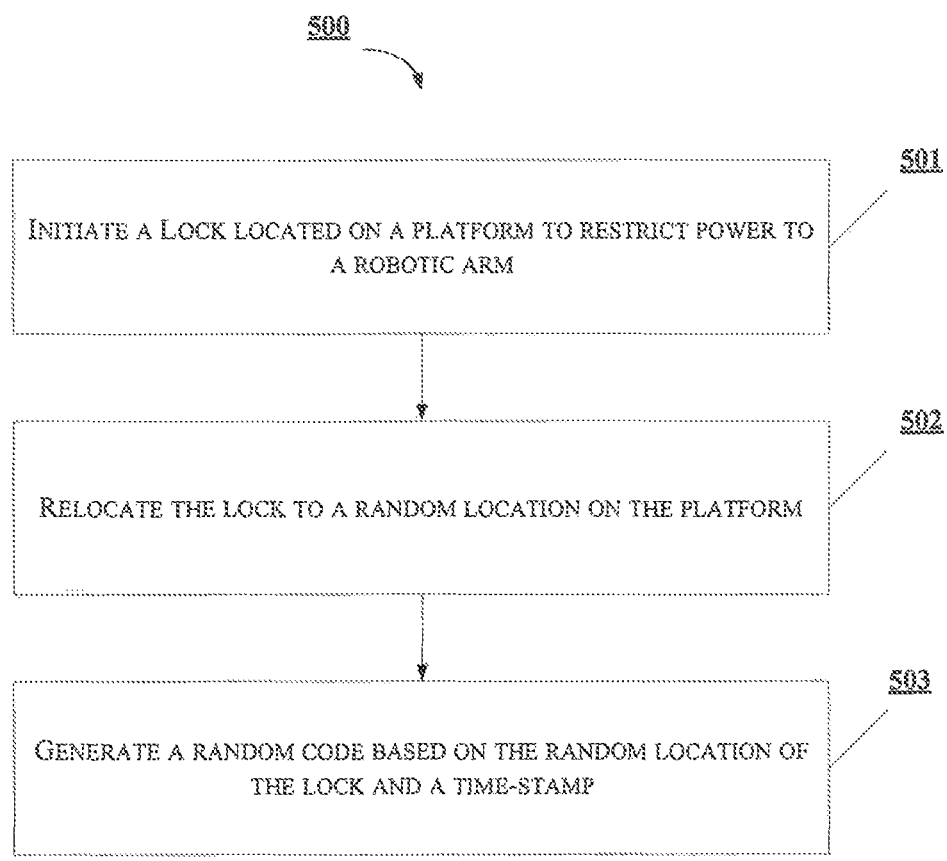

Now referring to FIG. 5, at step 501, the processing unit 110 initiates the lock 107 located on the platform 108 to restrict power to the plurality of actuators 105, upon initiation of the plurality of actuators 105 by the control unit 112.

At step 502, the processing unit 110 configures the lock 107 to be relocated to a random location from an initial location on the platform 108. The processing unit 110 instructs the lock actuator 109 to relocate the lock 107 to the random location on the platform 108. The lock actuator 109 may use the circular track 202 and the connecting track 201 to relocate the lock 107 to the random location on the platform 108.

At step 503, the processing unit 110 determines the random location and generates an encrypted code based on the random location of the lock 107. In an embodiment, the processing unit 110 may use any encryption method to generate the encrypted code.

Referring back to FIG. 4, at step 402 the communication module 310 receives the encrypted code from the processing unit and provides the encrypted code to the decryption module 312. The decryption module 312 decrypts the encrypted code and determines the random location of the lock 107. The successful decryption of the encrypted code indicates that the control unit 112 has proprietary decryption method to control the robotic arm 102. In an embodiment, the decryption module 312 may be a specific module for a particular robotic arm 102.

At step 403, the communication module 310 may instruct the lock 107 to supply power to at least one actuator among the plurality of actuators 105. The at least one actuator 105 may be used to pick the key 113 for releasing the lock 107.

At step 404, the actuator steering module 311 may steer the at least one actuator 105 such that the robotic arm 102 moves to the predefined location where the key 113 is placed. Further, the actuator steering module 311 may configure the at least one actuator 105 such that the one or more end effectors 106 picks the key 113 from the key platform 114. Thereafter, the actuator steering module 311 may steer the at least one actuator 105 such that the robotic arm 102 moves to the random location where the lock 107 is located. Further, the actuator steering module 311 configures the one or more end effectors 106 to insert the key 113 into the lock 107 and release the lock 107 such that power is supplied to the plurality of actuators 105.

FIG. 6A, FIG. 6B, FIG. 6C and FIG. 6D are examples illustrating various stages of the robotic arm 102 while providing security to robots.

Figure 6A:
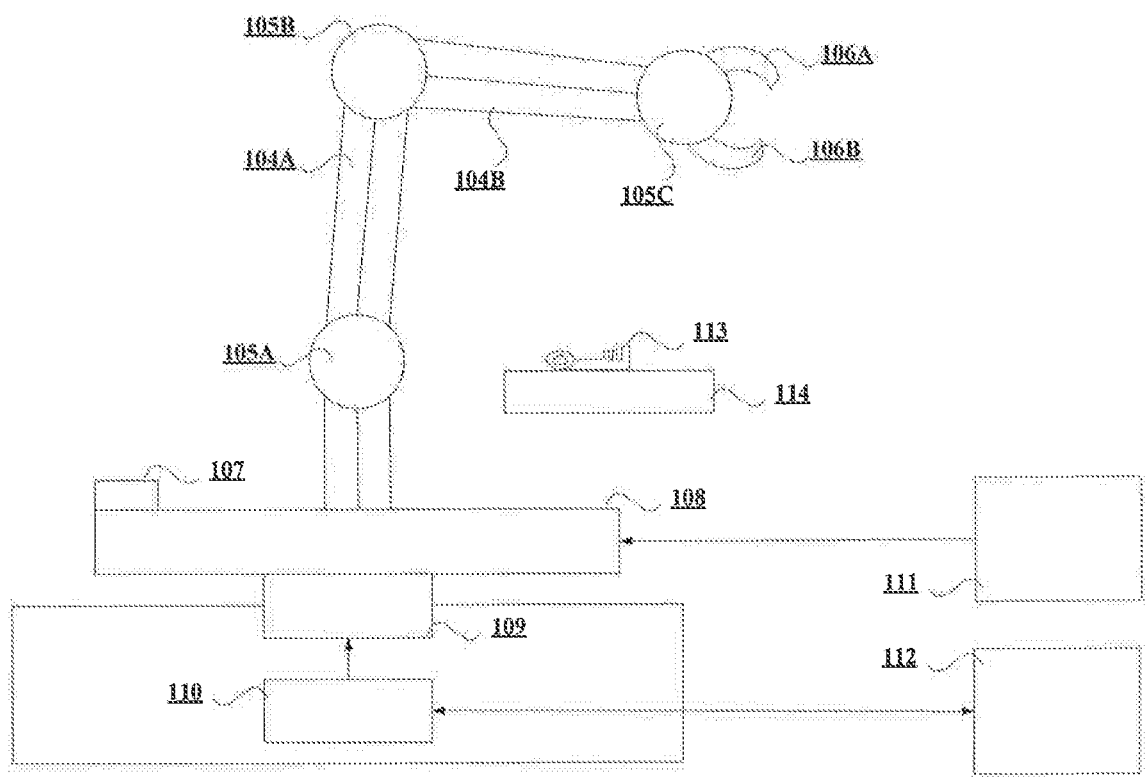
FIG. 6A, FIG. 6B, FIG. 6C and FIG. 6D show various structure of a security system for a robot in various stages of providing security to robots, in accordance with some embodiments of the present disclosure.

FIG. 6A shows an initial stage where the lock 107 is in an initial location on the platform 108. Also, the robotic arm 102 is in an initial position. Let us consider that the control unit 112 initiates the plurality of actuators 105. Now, the processing unit senses that the plurality of actuators 105 are initiated and immediately initiates the lock 107 to restrict power to the robotic arm 102.

Figure 6B:
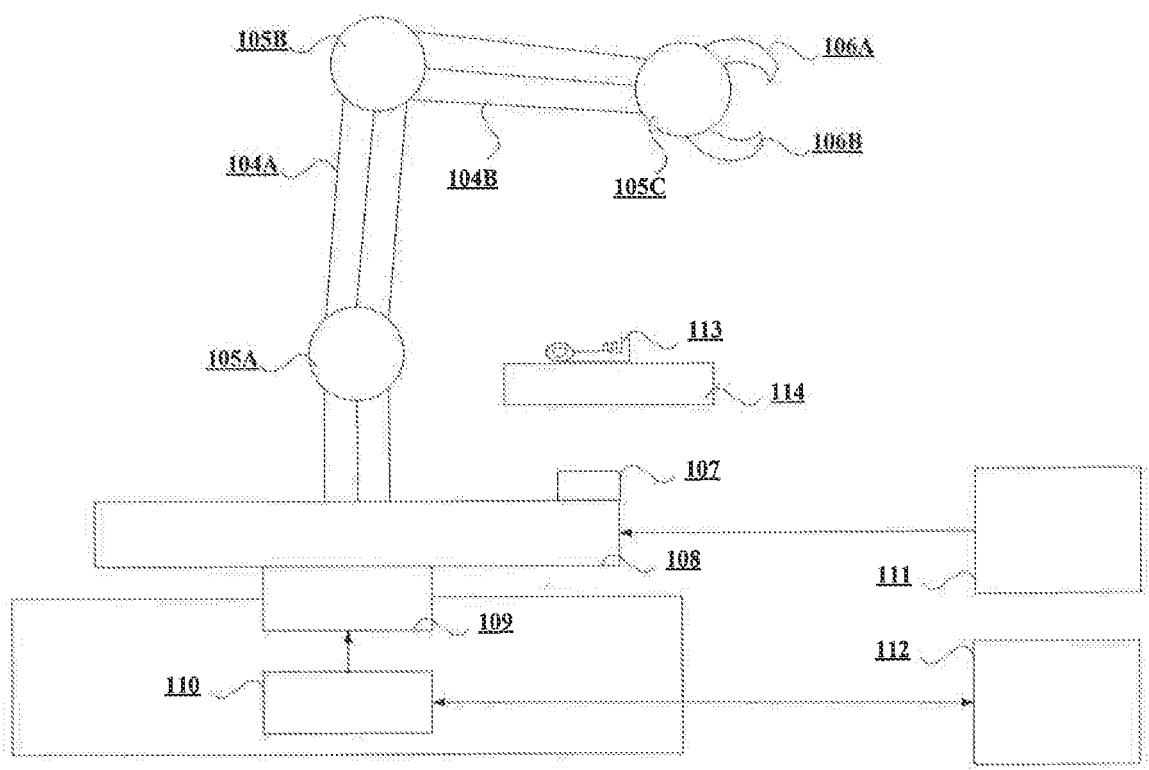

FIG. 6B illustrates relocating the lock 107 by the processing unit 110. Once the processing unit initiates the lock 107 to restrict power to the plurality of actuators 105, the processing unit 110 further instructs the lock actuator 109 to relocate the lock 107 to a random location on the platform 108. In an embodiment, the processing unit 110 may be aware of the initial location of the lock 107. The processor unit 110 may provide the initial location of the lock 107 to the lock actuator 109. The lock actuator 109 moves the lock 107 from the initial location to the random location on the platform 108. The random location may be calculated by the processing unit 110 using existing or upcoming methods.

Figure 6C:
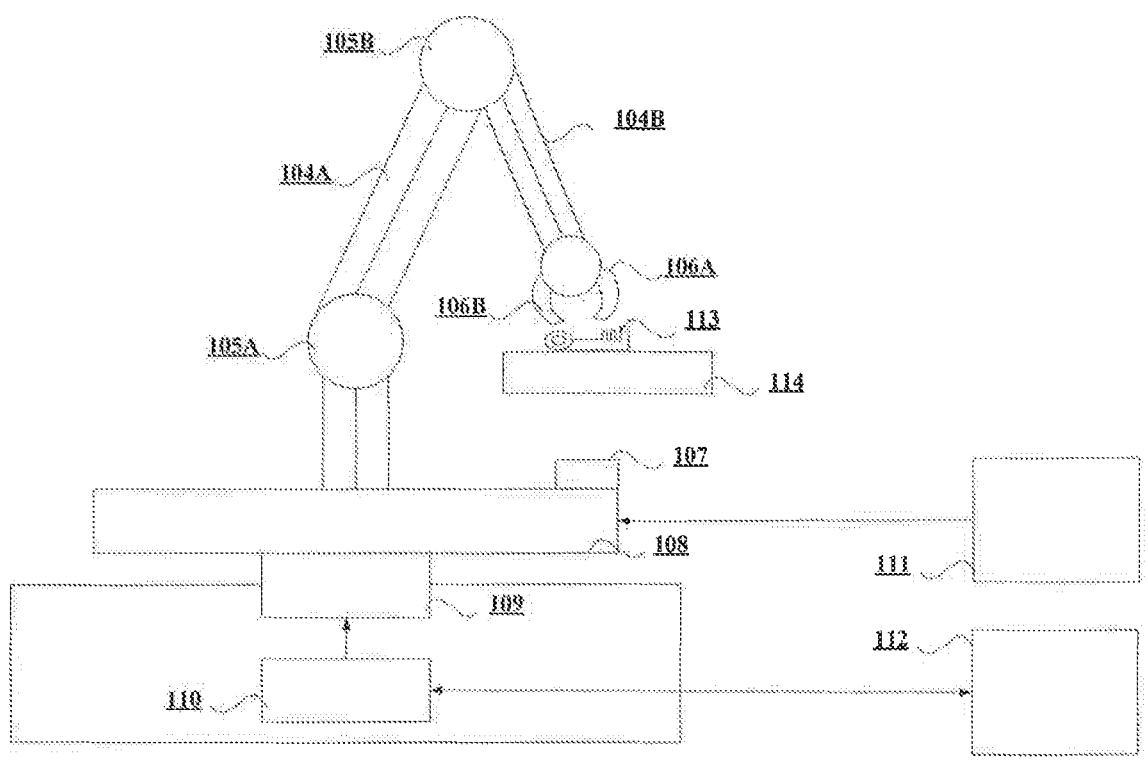

Further, the processing unit 110 generates the encrypted code based on the random location and provides the encrypted code to the control unit 112. Thereafter, the control unit 112 decrypts the encrypted code and the control unit 112 configures the lock 107 to supply power to at least one actuator 105 among the plurality of actuators 105. Furthermore, the control unit 112 provides instructions to the at least one actuator 105 to pick up the key 113 placed at the predefined location on the key platform 114. FIG. 6C illustrates the step where the at least one actuator is configured to pick the key 113 from the key platform 114. As seen in the FIG. 6C, the at least one actuator moves the second arm joint 105B towards the predefined location of the key 113. Further, the one or more end effectors 106 picks the key 113 from the key platform 114.

Figure 6D:
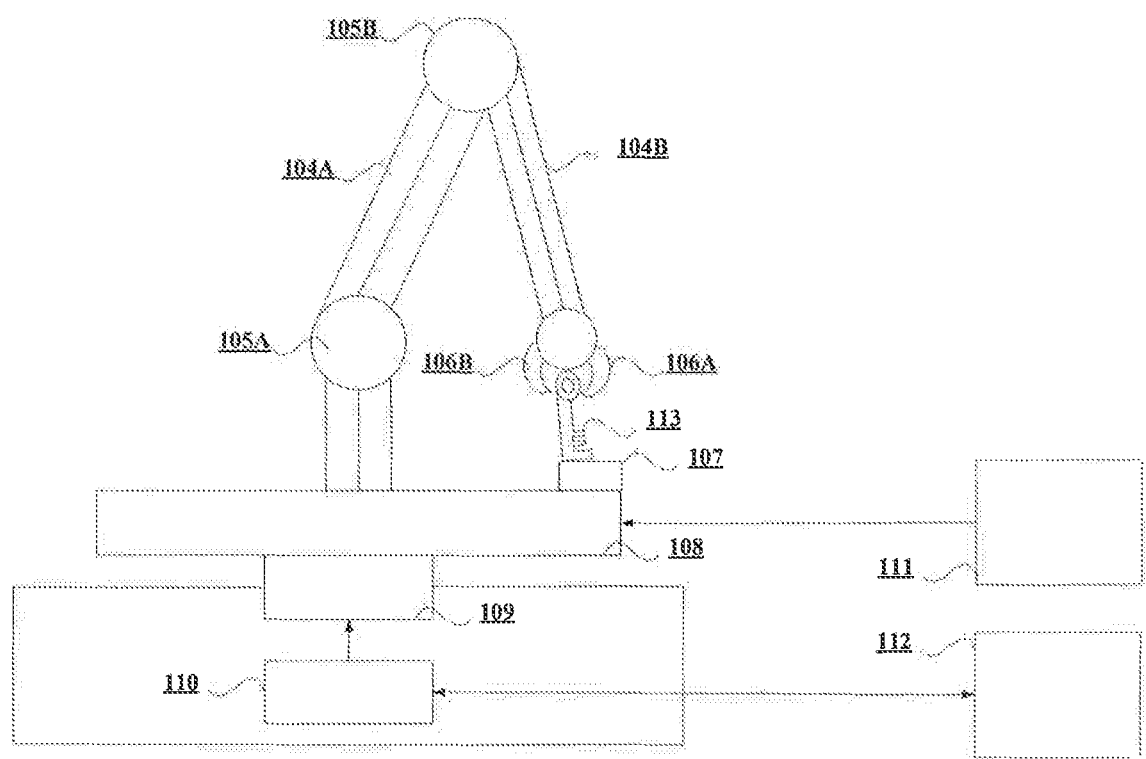

Once the key 113 is picked by the at least one actuator 105, the control unit 112 configures the at least one actuator 105 to move to the random location where the lock 107 is lock is located. This step is illustrated by FIG. 6D. The second arm joint 104B is moved to the predefined location of the key 113. Further, the one or more end effectors 106 inserts the key 113 into the lock 107 to release the lock 107. Once the lock 107 is released, the power is supplied to the plurality of actuators 105. Thus, the robotic arm 102 may be used for performing any desired task.

In an embodiment, the security system 100 as disclosed provides a physical safety to the robots. The lock 107 configured in the security system 100 restricts power to the robotic arm 102, and provides power only when the lock is released. Thus, misuse of the robots is eliminated.

In an embodiment, the encrypted code provided to the control unit 112 for decryption ensures that a genuine method is used for decryption and malwares are not used for decryption.

In an embodiment, the physical security provided to the robots eliminates accidents caused by misuse of robots.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 4, and FIG. 5 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference number | Description |
| --- | --- |
| 100 | Security system |
| 101 | Base |
| 102 | Robotic arm |
| 103 | Robotic arm column |
| 104 | Arm joints |
| 105 | Actuators |
| 106 | End effectors |
| 107 | Lock |
| 108 | Lock platform |
| 109 | Lock actuator |
| 110 | Processing unit |
| 111 | Power source |
| 112 | Control unit |
| 113 | Key |
| 114 | Key platform |
| 201 | Connecting track |
| 202 | Circular track |
| 301 | I/O interface |
| 302 | Memory |
| 303 | Processor |
| 304 | Data |
| 305 | Key data |
| 306 | Actuator data |
| 307 | Decryption data |
| 308 | Other data |
| 309 | Modules |

-continued

| Reference number | Description |
| --- | --- |
| 310 | Communication module |
| 311 | Actuator steering module |
| 312 | Decryption module |
| 313 | Other modules |

We claim:

1. A security system for robots, comprising:
a lock located on a platform, configured to restrict power supply to a plurality of actuators of a robotic arm;
a key placed at, a predefined location, at a predefined distance from the robotic arm configured to release the lock for providing power supply to the plurality of actuators; and
a processor, configured to:
restrict power supply to the robotic arm by initiating the lock, when the robotic arm is initiated;
relocate the lock to a random location on the platform, wherein the platform comprises a plurality of circular tracks and a plurality of circular connecting tracks, wherein the relocation of the lock is performed by a lock actuator, and wherein the lock actuator utilizes at least one of the plurality of circular tracks and at least one of the plurality of circular connecting tracks to relocate the lock to the random location on the platform;
generate an encrypted code based on the random location of the lock and a time-stamp; and
provide the encrypted code to the processor for decryption, wherein upon decryption, the processor configures the lock to supply power to the plurality of actuators, wherein the plurality of actuators operates the robotic arm to pick the key and release the lock for supplying power to the plurality of actuators.

2. The security system of claim 1, further comprises a power supply for supplying power to the plurality of actuators robotic arm.

3. The security system of claim 1, wherein each of the plurality of actuators is configured to operate a predefined portion of the robotic arm.

4. A method for providing security for robots, comprising:
initiating, by a processor, a plurality of actuators of a robotic arm,
initiating, by the processor, a lock located on a platform to restrict power to the robotic arm;
relocating, by the processor, the lock to a random location on the platform, wherein the platform comprises a plurality of circular tracks and a plurality of circular connecting tracks, wherein the relocation of the lock is performed by a lock actuator, and wherein the lock actuator utilizes at least one of the plurality of circular tracks and at least one of the plurality of circular connecting tracks to relocate the lock to the random location on the platform;
generating, by the processor, an encrypted code based on the random location of the lock and a time-stamp;
decrypting, by the processor, the encrypted code for determining the random location of the lock;
configuring, by the processor, the lock to supply power to at least one actuator among the plurality of actuators of the robotic arm; and
instructing, by the processor, the at least one actuator to operate the robotic arm to pick a key placed at a predefined located, at a predefined distance from the robotic arm, to release the lock for providing power supply to the plurality of actuators.

5. The method of claim 4, wherein the plurality of actuators of the robotic arm is supplied with power.

6. A non-transitory computer readable medium including instructions stored thereon that when processed by at least one processor cause a device to perform operations comprising:
initiating a plurality of actuators of a robotic arm
initiating a lock located on a platform to restrict power to the robotic arm;
relocating the lock to a random location on the platform, wherein the platform comprises a plurality of circular tracks and a plurality of circular connecting tracks, wherein the relocation of the lock is performed by a lock actuator, and wherein the lock actuator utilizes at least one of the plurality of circular tracks and at least one of the plurality of circular connecting tracks to relocate the lock to the random location on the platform;
generating an encrypted code based on the random location of the lock and a time-stamp;
decrypting the encrypted code for determining the random location of the lock;
configuring the lock to supply power to at least one actuator among the plurality of actuators of the robotic arm; and
instructing the at least one actuator to operate the robotic arm to pick a key placed at a predefined located, at a predefined distance from the robotic arm, to release the lock for providing power supply to the plurality of actuators.

7. The medium of claim 6, wherein the plurality of actuators of the robotic arm is supplied with power.

* * * * *